United States Patent [19]

Nestich

[11] Patent Number: 4,600,031

[45] Date of Patent: Jul. 15, 1986

[54] BALL COCK AND FLOAT ASSEMBLY

[75] Inventor: R. Frank Nestich, Glenmont, Ohio

[73] Assignee: Clevepak Corporation, Purchase, N.Y.

[21] Appl. No.: 735,588

[22] Filed: May 20, 1985

[51] Int. Cl.[4] .................. F16K 24/02; F16K 31/26; F16K 33/00

[52] U.S. Cl. .................................. 137/218; 137/426; 137/432; 137/433; 137/436; 137/444; 251/250

[58] Field of Search .............. 137/414, 426, 430, 432, 137/433, 435, 436, 437, 217, 218, 442, 444; 251/249.5, 250

[56] References Cited

U.S. PATENT DOCUMENTS

| | | | |
|---|---|---|---|
| 2,706,998 | 4/1955 | Bletcher et al. | 137/436 |
| 2,799,290 | 7/1957 | Svirsky | 137/436 |
| 3,171,424 | 3/1965 | Shames et al. | 137/435 |
| 3,194,258 | 7/1965 | Grant | 137/414 |
| 3,332,433 | 7/1967 | Edmondson | 137/215 |
| 3,516,094 | 6/1970 | Reagan | 137/436 |
| 3,797,518 | 3/1974 | Holm et al. | 137/442 |
| 3,895,645 | 7/1975 | Johnson | 137/414 |
| 4,180,096 | 12/1979 | Johnson | 137/414 |
| 4,182,364 | 1/1980 | Gilbert et al. | 137/437 |
| 4,340,082 | 7/1982 | Straus | 137/426 |
| 4,414,998 | 11/1983 | Rudler et al. | 137/432 |
| 4,431,024 | 2/1983 | Gallagher | 137/430 |
| 4,479,631 | 10/1984 | Nestich et al. | 251/120 |

Primary Examiner—G. L. Walton

Attorney, Agent, or Firm—Renner, Kenner, Greive, Bobak & Taylor

[57] ABSTRACT

A ball cock and float assembly (10) having a shank portion (11) that is adapted to be insertably received through the inlet opening (13) in the bottom wall (14) of a reservoir tank (12). A support means (50) extends upwardly of the shank portion (11). The support means (50) comprises post means (30) that extend fixedly upwardly from the shank portion (11), and extension means (46) that are telescopically slidable along the post means (30). A lock (42) secures the extension means (46) at a selected position along the post means (30) to provide in gross adjustment in the vertical height of the float assembly (110) that is movable along the extension means (46). A valve (55) is carried by the extension means (46) upwardly of the float means (110). An inlet conduit (52) communicates from the shank portion (11) through the post and extension means (30, 46) to the inlet port (54) of the valve means (55). A discharge conduit (53) communicates from the outlet port (62) of the valve (55) through the support means (50) and opens (at 40) into the reservoir tank (12). A siphon-break chamber (60) communicates between the discharge conduit (53) and atmopshere, and a lever (150) actuates the valve (55) in response to vertical movement of the float assembly (110). The lever (150) is connected to the float assembly (110) by an adjusting means (136, 144) that permits fine adjustment in the vertical height of the float assembly (110).

9 Claims, 7 Drawing Figures 4,600,031

BALL COCK AND FLOAT ASSEMBLY

TECHNICAL FIELD

The present invention relates generally to sanitation devices. More particularly, the present invention relates to ball cock assemblies for controlling the admission of flush fluid, normally water, into the reservoir tank used in conjunction with toilet bowls. Specifically, the present invention relates to a ball cock assembly that employs a balanced valve mechanism in conjunction not only with means by which to effect a siphon break but also with a float means having a facile vertical adjustability.

BACKGROUND ART

Accidental reverse flow from a sanitary system into a water supply system is of particular concern in view of its likely serious impact on the public welfare, and the various health authorities are continually urging the adoption of more effective legislation and building codes with an eye toward the complete elimination of this potentially serious problem. Generally, water and sanitary systems can be isolated from each other by spacial separation. However, the construction of water closets does not generally permit effective separation.

The reservoir tank of a water closet is a particularly susceptible source for this undesirable reverse flow. For example, reverse flow can be occasioned within the reservoir tank if the water supply line which feeds the tank should develop a leak. In such a situation the resulting pressure reduction in the water supply line can effect a siphoning of the water from the reservoir tank into the water supply line—i.e., the unacceptable reverse flow.

A number of prior known ball cock arrangements have been employed over the years to alleviate the possibilty of reverse flow when the feed line develops a leak. One such approach has been to provide a ball cock valve that would remain closed irrespective of the line pressure in the water line feeding the reservoir tank. Such a result is achieved by the balance valve mechanism disclosed in my prior U.S. Pat. No. 4,479,631, issued Oct. 30, 1984 for a "Hydraulically Balanced Valve Mechanism." According to that arrangement, which also provides a number of other desired features as a result of its balanced operation, reverse flow is obviated so long as the toilet is not flushed and the level of the fluid in the reservoir remains sufficiently high that the reservoir filling cycle is not initiated.

However, even with that favorable design reverse flow could be occasioned if the tiolet were flushed before the leak in the supply line could be corrected. In that situation, the flush cycle would lower the water in the reservoir tank, allowing the ball cock to open for the admission of replenishing water to the reservoir tank. With the ball cock thus opened, a reduction in the line pressure within the supply line can initiate a siphoning of the water from the reservoir tank into the supply line.

SUMMARY OF THE INVENTION

It is, therefore, a primary object of the present invention to provide a ball cock assembly that can employ a desirable balanced valve mechanism and yet preclude unacceptable reverse flow through that valve that might otherwise be occasioned by a reduction of the pressure in the water supply line, even when the ball cock is opened to admit replenishment of the water within the reservoir tank.

It is another object of the present invention to provide a ball cock assembly, as above, in which the float assembly associated therewith is vertically adjustable.

It is a further object of the present invention to provide a ball cock and float assembly, as above, wherein vertical adjustments—both fine and in gross—can be conveniently effected.

These and other objects, together with the advantages thereof over existing and prior art forms which will become apparent from the following specification, are accomplished by means hereinafter described and claimed.

In general, a ball cock and float assembly embodying the concept of the present invention has a shank portion that is adapted to be insertably received through, and secured to, the inlet opening in the reservoir or flush, tank of a water closet. A water supply line is connected to said shank portion.

Support means extend upwardly of said shank portion, and a float means is movable vertically along said support means in response to the water level within the reservoir tank. Moreover, in gross vertical adjustment of the float means is achieved in having the support means longitudinally extendable and by incorporating a cooperative lock means within the support means to secure the support means in the desired longitudinal extension.

A valve means, that is carried by the support means, is presented upwardly of the float means, and an inlet passage communicates through the support means from the shank portion of the ball cock and float assembly to the valve means in order to permit the water from the supply line to access the inlet port of the valve means. A discharge passage also communicates through the support means from the outlet port of the valve means into the reservoir, or flush, tank. The discharge passage extends downwardly into the reservoir tank to open in proximity to, or below, the lowermost level of water expected to remain within the reservoir tank at the end of the flush in order to minimize the noise that would otherwise result as the water in the reservoir tank is replenished.

A siphon-break is provided in proximity to the valve means. The siphon-break communicates between the discharge passage and the atmosphere to preclude reverse flow through the discharge tube, and yet is constructed so as to obviate exiting flow of water from the discharge passage into the atmosphere, even within the reservoir tank.

One preferred embodiment of a ball cock and float assembly incorporating the concepts of the present invention is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 2:
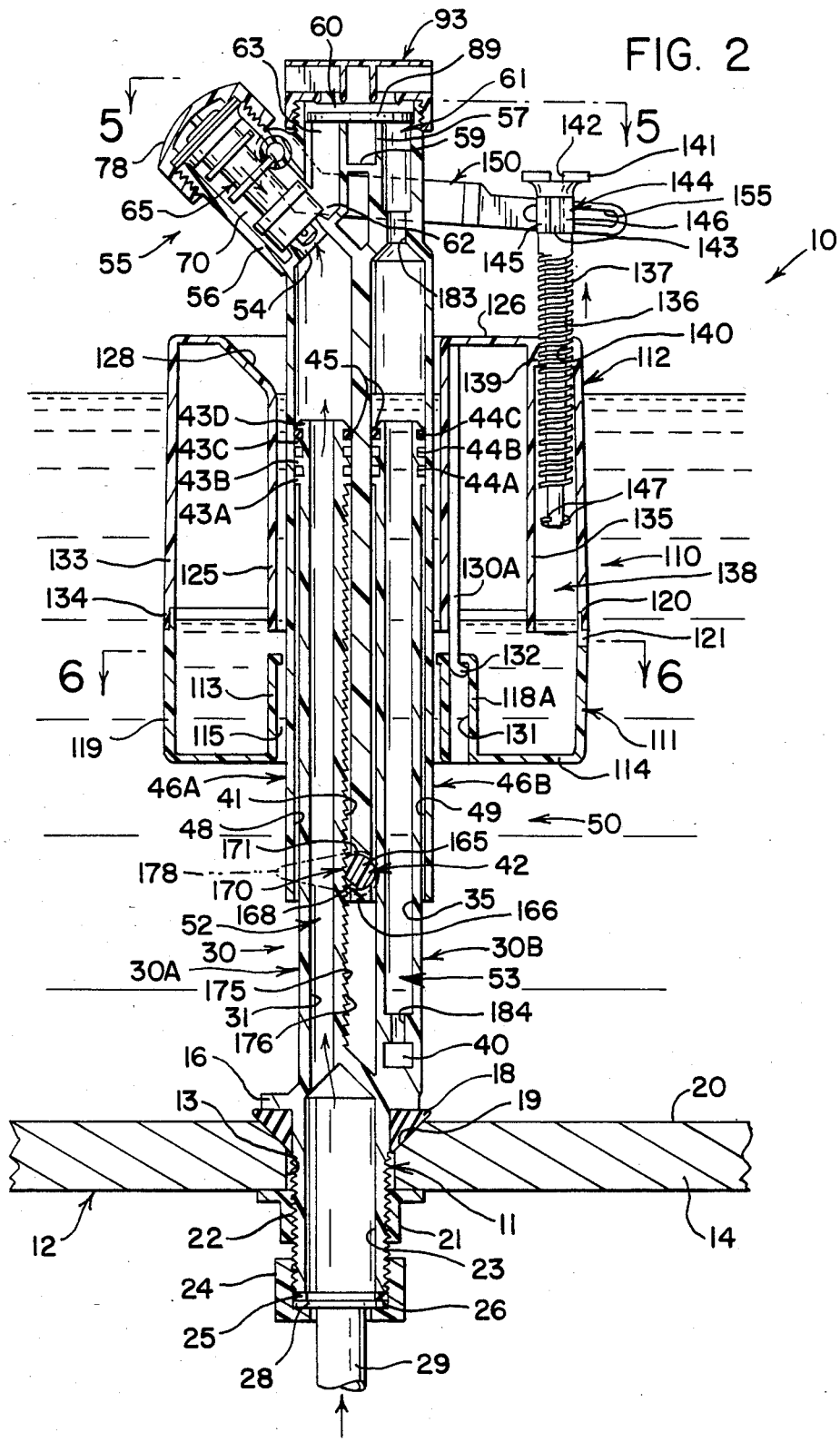
FIG. 2 is a longitudinal cross section taken substantially along line 2—2 of FIG. 1 with the components thereof disposed as they would be with the reservoir tank filled and with the valve mechanism of the ball cock closed.
Figure 4:
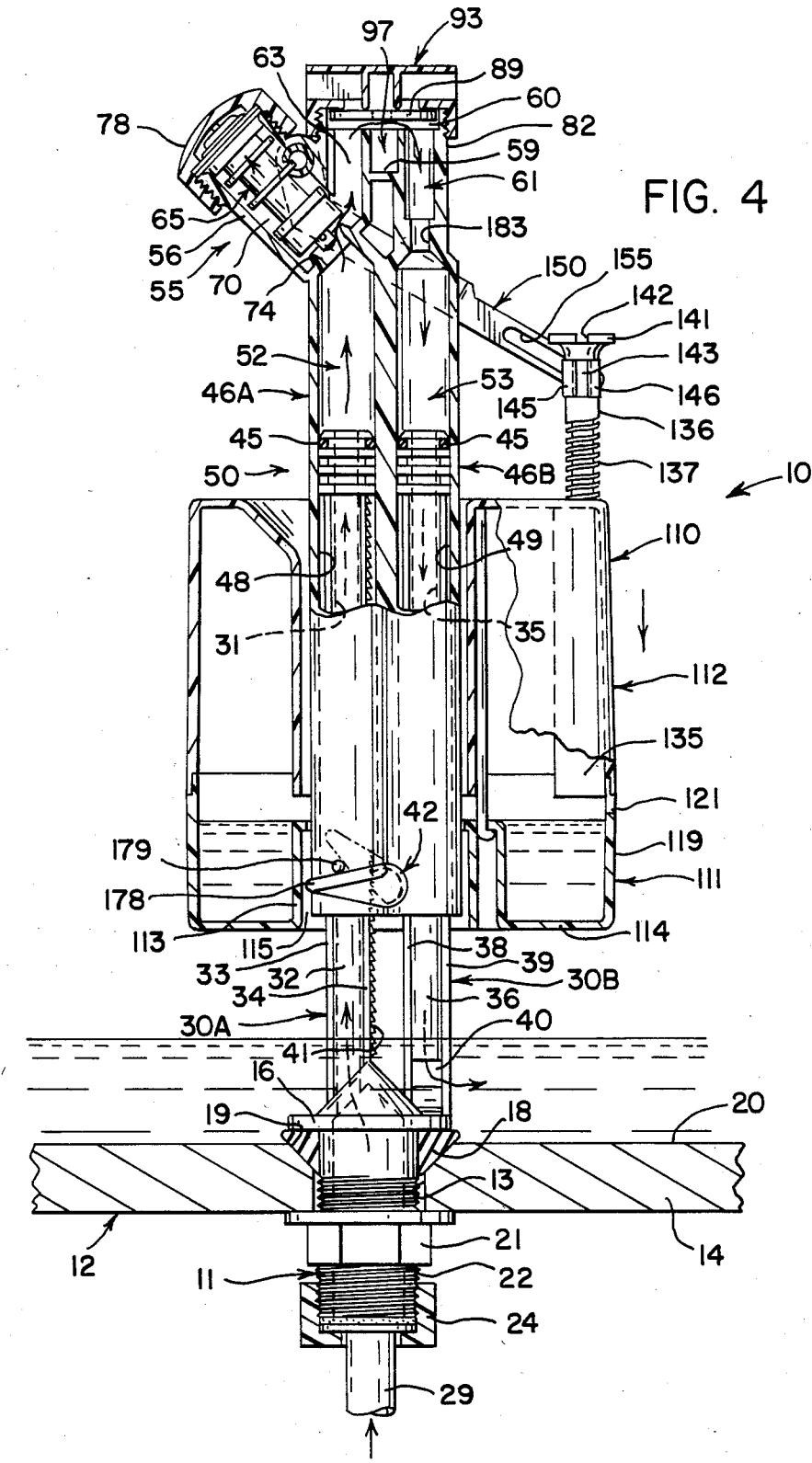
FIG. 4 is a view similar to FIG. 2 except that the components thereof are disposed as they would be with the level of the water in the reservoir tank lowered to approximately the level it would be upon completion of the flush and with the valve mechanism of the ball cock opened to admit water from the supply line to replenish the water in the reservoir tank and return it to the level depicted in FIG. 2.

A representative configuration of a ball cock and float assembly embodying the concept of the present invention is identified by the numeral 10 on the accompanying drawings. A shank portion 11 is presented at the lower extremity of the assembly 10, and it is the shank portion 11 that provides the means by which the ball cock assembly may be installed within a reservoir, or flush, tank 12 (FIGS. 2 and 4). Specifically, the shank portion 11 may pass through an aperture, or inlet opening, 13 in the bottom wall 14 of the reservoir, or flush, tank 12. An abutment flange 16 extends radially outwardly from the upper periphery of the shank portion 11, and a typical sealing gasket 18 is received between the abutment flange 16 and the conical sealing surface 19 interposed between the aperture 13 and the upper surface 20 on the bottom wall 14 of the reservoir tank 12. The gasket 18 is sealingly compressed to prevent leakage by tightening the mounting nut 21 along the threads 22 on the radially outer surface of the shank portion 11.

A cylindrical bore 23 opens axially through the lower treminus of the shank portion 11. If the shank portion 11 were fabricated of metal, the internal diameter of the bore 23 could be selected such that one could effect a sweat connection to the supply line. However, when the shank portion is made of a rigid plastic, the threads 22 may also receive a coupling nut 24 by which sealingly to compress a gasket 25 between the lower end 26 of the shank portion 11 and a mounting flange 28 secured to, and presented from the fluid supply line 29, as is well known to the art.

Post means, indicated generally by the numeral 30, are supported by, and extend upwardly from, the shank portion 11. With reference to post member 30A an interior passage 31 extends longitudinally within the tubular member 32 that is secured to the shank portion 11. The passage 31 may comprise at least a portion of the hereinafter more fully described inlet conduit 52 which communicates between the cylindrical bore 23 interiorly of the shank portion 11 and the valve 55, as is also more fully hereinafter described. As such, the interior passage does connect directly with the cylindrical bore 23. Stiffening flanges 33 and 34 are integrally formed with the tubular member 32 and are oriented in diametric opposition to complete the post member 30A.

An interior passage 35, the details of which are hereinafter more fully described in conjunction with the operation of the assembly 10, may similarly extend longitudinally within a tubular member 36 that is also formed with integral, diametrically opposed stiffening flanges 38 and 39 to comprise a second post member 30B. The tubular member 36, however, terminates axially upwardly of the shank portion 11 to provide the opening 40 from the interior passage 35 into the interior of the reservoir tank 12. The stiffening flanges 38 and 39 extend downwardly beyond the opening 40 of the tubular discharge member 30 to connect with the shank portion 11. The passage 35 may comprise at least a portion of the hereinafter more fully described discharge conduit 53 which communicates between the valve 55 and the opening 40.

The post members 30A and 30B are preferably oriented with the flanges 34 and 38 lying in laterally spaced opposition, the surface of flange 34 presenting a successive plurality of transversely oriented teeth 41 which function in conjunction with the hereinafter more fully described lock means 42.

The uppermost extremity of each post member 30A and 30B terminates in a sequential series of circumferential lands and grooves for receiving and positioning sealing means. As depicted, four, axially spaced, radially extending lands 43A through 43D delineate three annular grooves 44A through 44C, each of which may receive an O-ring 45.

A pair of annular extension members 46A and 46B are telescopically received over the respective post members 30A and 30B. The cylindrical inner passages 48 and 49 of the respective extension members 46A and 46B are closely, but slidably, received over the lands 43 of the respective post members 30A and 30B such that engagement of the O-rings 45 with the corresponding surfaces 48 and 49 effects a watertight seal. In this arrangement the post means 30A and 30B cooperate with the extension members 46A and 46B, respectively, to form the support means, identified generally by the numeral 50.

The aforedescribed sealing arrangement assures that the axial passage 48 within the extension member 46A effectively communicates with the passage 31 within the post member 30A to complete the inlet conduit 52 which conveys the water from the supply line 29 to the inlet port 54 of the valve 55 operatively received within a housing 56 that is obliquely secured to the upper extremity of the extension member 46A.

The axial passage 49 within the extension member 46B effectively communicates with passage 35 within post member 30B to complete the discharge conduit 53. The axial passage 49 within extension member 46B opens through, and extends upwardly above, the bottom wall, or floor, 59 of the siphon-break chamber 60 by virtue of a tubular wall 57, the interior of which defines a cylindrical low pressure cavity 61 within the siphon-break chamber 60. The outlet port 62 of the valve 55 opens directly into line pressure cavity 63 of the siphon-break chamber 60. The remaining structural details as well as the operation of the siphon-break chamber 60 will be hereinafter more fully described.

The valve 55 is preferably of the balanced variety, and a detailed description thereof is more fully set forth in my previously identified U.S. Pat. No. 4,479,631, the disclosure of which is incorporated herein by reference. Briefly, a balanced valve 55 has a valve element 65 comprising a piston 66 secured to a stem portion 68 that is reciprocatingly slidable within the cylindrical chamber 70 interiorly of the housing 56. The head of the piston 66 is recessed to provide an annular skirt 71. A nozzle 72 extends coaxially beyond the skirt 71, and an annular washer 73 is received between the skirt 71 and the nozzle 72.

An annular seat 74 is formed within the valve housing 56 to circumscribe the inlet port 54. Translation of the valve element 55 in one direction brings the washer 73 into sealing engagement with the seat 74 to close the flow of fluid through the valve 55. Axial translation of the valve element 65 in the opposite direction disengages the washer 73 from the seat 74 to open the valve 55 and permit water to flow through the inlet port 54, into the valve chamber 70 and discharge through the outlet port 62.

The unique arrangement and disposition of the orifices 75 within the nozzle 72, and their communication with the control chamber 76, effects the desired hydraulic assistance in moving the valve element between its open and closed positions effectively, effectively and without water hammer over a wide range of line pressures, as is more fully explained in said U.S. Pat. No. 4,479,631.

An end cap 78 may also interact with the diaphragm 79, as is also fully disclosed in said U.S. Pat. No. 4,479,631, to preclude the deleterious imposition of shear stresses on the diaphragm 79 when the end cap 78 is either loosened or tightened onto the housing 56.

Figure 3:
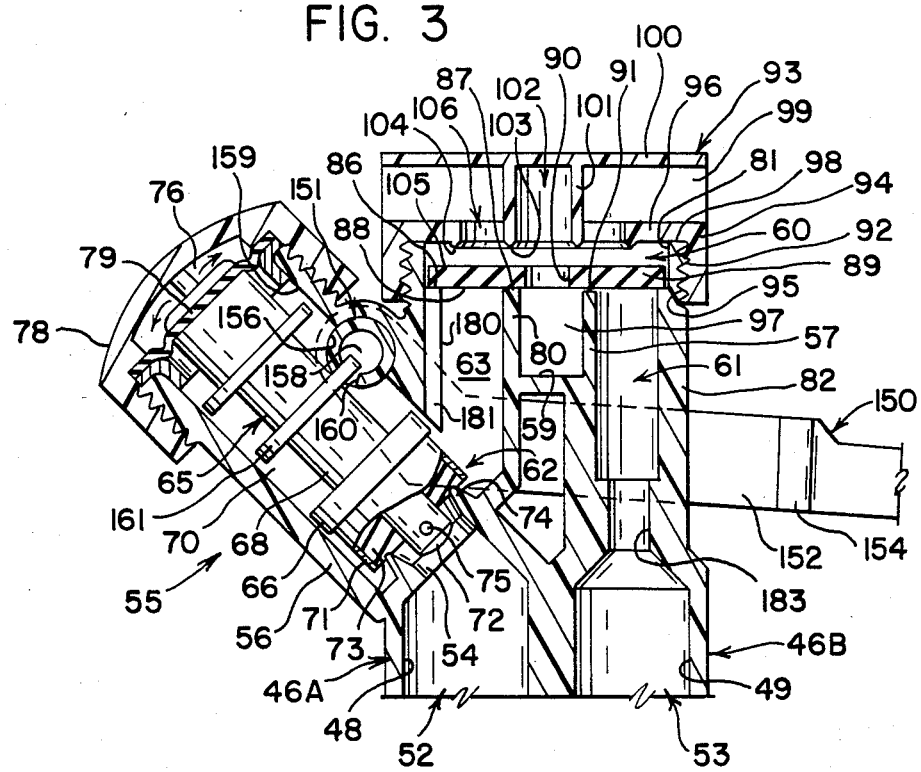
FIG. 3 is an enlarged area of FIG. 2 provided more clearly to present the structural arrangement of the siphonbreak and the associated balanced valve mechanism.
Figure 5:
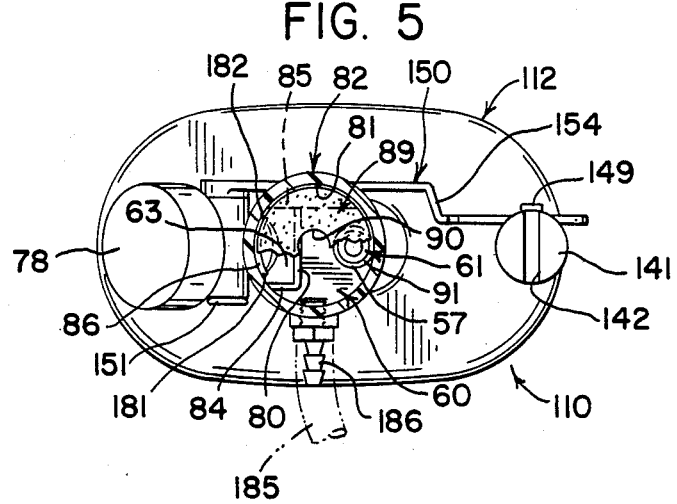
FIG. 5 is a horizontal section taken substantially on line 5—5 of FIG. 2.
Figure 6:
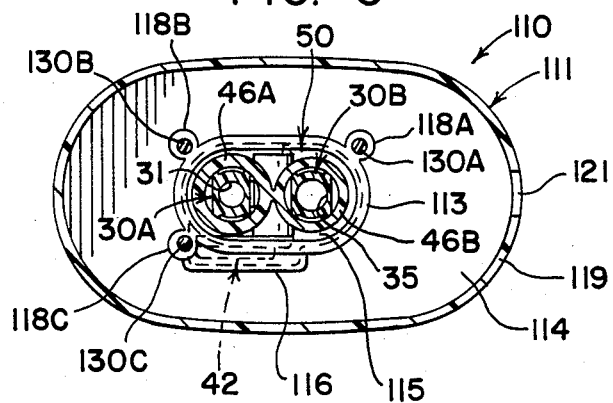
FIG. 6 is a horizontal section taken substantially along 6—6 of FIG. 2.

The aforementioned pressure cavity 63 is defined by a generally U-shaped wing wall 80 (FIGS. 3 and 5) that extends upwardly from the floor 59 of the break chamber 60 for approximately ⅔ the height of the chamber 60. A typical chamber 60 might have a height of approximately 9/16 inch (1.429 cm), and in that event the height of the wall 80 could typically be on the order of approximately 3/16 inch (0.476 cm) above the floor 59 of the chamber 60.

The wings 84 and 85 (FIG. 5) at each end of the wall 80 intersect the interior surface 81 of the casing 82 which circumscribes the chamber 60. A support shelf 86 extends radially inwardly from the interior surface 81 of the casing 82 and preferably lies in the same horizontal plane as the weir formed by the upper edge 87 (FIG. 3) of the wing wall 80 so the shelf 86 and upper edge 87 can engage the undersurface 88 of the flutter washer 89 in its static position depicted in FIGS. 2 and 3.

The flutter washer 89 is preferably an annular, and generally planar, flat disk having a central aperture 90. When employing an annular, flutter washer 89 the interior surface 81 of the casing 82, at least upwardly of the wall 80 and shelf 86, is of uniform, cylindrical cross section to permit unencumbered vertical translation of the flutter washer 89 therein.

The second, or tubular, wall 57 which extends axially upwardly from the floor 59 of chamber 60 to define the low pressure cavity 61 within the siphon-break chamber 60 preferably terminates in a weir defined by the upper edge 91 of the wall 57. The upper edge 91 of wall 57 preferably lies slightly beneath the plane defined by the upper edge 87 of the wing wall 80 and the support shelf 86 to provide a pressure drop location for a purpose more fully hereinafter explained in conjunction with the operation of the assembly 10. This difference in height need only be on the order of two to four hundredths of an inch (0.508 to 1.016 mm) to achieve the desired effect.

At this point it should also be noted that the central aperture 90 of the flutter washer 89 is located to communicate with the well portion 97 of the siphon-break chamber 60 medially of the walls 80 and 57, the purpose for which will also be more fully appreciated in conjunction with the explanation as to how the assembly 10 operates.

The external surface of the casing 82 is threaded, as at 92 (FIGS. 2 and 3), to receive a vent cap 93. The cap 93 has a cylindrical skirt portion 94, the interior of which is provided with threads 95 to engage the threads 92 whereby removably to mount the cap 93. A limit flange 96 extends radially inwardly from the upper extremity of the skirt portion 94 transversely to engage the upper rim 98 of the casing 82 and thus define the extent to which the cap 93 may be screwed onto the housing 82. Upwardly of the limit flange 96 is a latticework of fins 99 that are disposed vertically upwardly with respect to the transverse plane of the limit flange 96 and terminate in a transverse splash wall 100. Centrally of the cap 93, and extending axially downwardly from the splash wall 100 and radially through the latticework of fins 99 is an annular ring 101 which defines a breather recess 102 which circumscribes the aperture 90 and tends thereby not only to effect a seal between the aperture 90 and the latticework of fins 99 but also to provide a small reservoir of air by which to accelerate the hereinafter described siphon-break action. The fins 99 are disposed with respect to the radially innermost extent of the limit flange 96 and the radially outermost extent of the ring 101 so as to provide a vent passage 106 from the siphon-break chamber 60 through the central aperture 90 of flutter washer 89 and between the limit flange 96 and the ring 101 and thence outwardly along the fins 99 to atmosphere, even when the cap 93 is secured tightly to the casing 83.

The lowermost rim 103 of the ring 101 preferably lies within the same plane as the downwardly facing rib 104 of the limit flange 96. As such, the rim 103 and rib 104 cooperate to provide a combined stop and seal means against which the upper surface 105 of the flutter washer 89 abuts when the washer is in the position depicted in FIG. 4, as will hereinafter be more fully explained in conjunction with the explanation of the operation.

The float assembly 110 generally comprises a lower, cup portion 11 and an upper, bell portion 112 which are conjoined and which are loosely received over the exterior of the extension means 46A and 46B to be vertically movable in response to the water level within the reservoir tank 12.

Specifically, the cup portion 111 has a central trunk 113 that extends upwardly from the base 114. The trunk 113 defines a central opening 115 (FIG. 5) of generally race track configuration to be slidable along the conjoined extension members 46A and 46B without interference. In order to preclude interference with the lock means 42 the trunk 113 may also be recessed, as at 116. A plurality of cylindrical anchor members 118A through 118C are disposed about the perimeter of the trunk 113, and the outer wall 119 of the cup portion 111 extends upwardly from the base 114 in spaced relation outwardly of the trunk 113 to terminate in a lip 120.

The minimum amount of water retained within the cup portion 111 is determined by the height to which the trunk 113 extends upwardly from the base 114, so long as the height of the trunk is lower than the height of the lip 120 above the base 114, and an overflow notch 121 is provided through the upper portion of the outer wall 119 to define the maximum amount of water to be received within the float means 110, as will also be hereinafter more fully explained in conjunction with the description of the operation.

The bell portion 112 of the float means 110 is configured to retain air and thereby provide the desired buoyancy. The bell portion 112 has a central sleeve portion 125 that extends downwardly from the upper wall 126 and is of generally similar cross-sectional shape as the trunk 113 in order that it too can be vertically movable with respect to the extension members 46A and 46B that it circumscribes, and without interference. As depicted in FIGS. 2 and 4, the sleeve portion 125 may be haunched, as at 128, to prevent interference with the housing 56 of the valve 55 should it be desired, or required, that the float assembly 110 rise to its highest position with respect to the extension members 46A and 46B.

A plurality of securing pins 130A through 130C are secured to, and are formed with, the sleeve portion 125 and extend axially beyond the sleeve to be received within bores 131 extending axially through the corresponding anchor members 118A through 118C in the cup portion 111. At least a portion of each bore 131 is of a proper diameter as to engage the pins 130 frictionally and thereby secure the cup portion 111 to the bell portion 112. If desired, the pins 130 may be bent, as depicted in FIG. 2 at 132, or otherwise disfigured to assure that the cup portion 111 will remain attached to the bell portion 112.

The outer wall 133 of the bell portion 112 extends downwardly from the upper wall 126, and the lower edge thereof is recessed, as at 134, to receive the lip 120 and thereby align the cup and bell portions 111 and 112, respectively, into their conjoined disposition.

A U-shaped partition 135 extends from the upper wall 126 and downwardly along the outer wall 133 and is secured thereto to maintain the airtight integrity of the bell portion 112 upwardly from the lower extremity of the sleeve portion 125. An adjusting means in the form of a threaded shaft 136 is receivable within the cavity 138 bounded by the interior of the U-shaped partition 135 and the adjacent portion of the outer wall 133. In proximity to the intersection of the partition 135 and the upper wall 126 a web portion 139 may be provided, and tapped, as at 140, to permit the shaft 136 to be positioned vertically with respect to the float assembly 110.

The shaft 136 is preferably provided with a head portion 141 that is slotted, as at 142, to permit the shaft 136 to be turned by virtue of a screwdriver. Between the head portion 141 and the threads 137 on shaft 136 is an annular recess 143 to which a collar 144 may be secured. The collar may be annularly discontinuous to define a pair of opposed wing walls 145 and 146 that will snap onto the recess 143. By making the vertical dimension of the recess 143 only slightly greater than the corresponding dimension of the collar 144, the collar will translate vertically with the recess 143 as threaded shaft 136 is turned within the tapped web portion 139.

As best seen in FIG. 2 the vertically adjustable shaft 136 is captured within the tapped portion 140 of the web 139 so as to preclude the shaft 136 from being unscrewed to the extent that it can be inadvertently disconnected from the bell portion 112. This may be accomplished by providing a pair of planar fins 147, which extend radially outwardly from the shaft 136 in axially spaced relation beneath the threads 137. The space between the threads 137 and the fins 147 is preferably of greater axial span than the axial span of the threads 140 within the web 139. The fins 147 are disposed transversely of the shaft 136 and are of sufficient angular extent in the plane oriented transversely of the shaft 136 that they do not readily engage the threads 140 tapped interiorly of the web portion 139. However, the fins 147 are to be sufficiently flexible that by exerting a modicum of axially applied force to, and by simultaneously tilting, the shaft 136 as it is rotated, one may manually effect an engagement between the fins 147 and the threads 140 sufficient to permit assembly and disassembly of the shaft 136 with respect to the web 139.

A connecting pin 148 (FIG. 1) extends outwardly from the collar 144 and terminates in a retaining flange 149 for attachment to the hereinafter described lever 150 that actuates the valve 55.

The lever 150 is generally of the first class variety, but is uniquely modified such that the fulcrum 151 incorporates the resistance arm, as discussed immediately below. The effort arm 152 extends outwardly from the fulcrum 151 and is doglegged, as at 153, and laterally offset, as at 154, to avoid interference with the extension members 46A and 46B. The end portion of the lever 150 is slotted, as at 155, to engage the pin 148. In fact, the width of the retaining flange 149 may be such that it will be insertable through the slot 155, and by orienting the flange 149 parallel to the axis of the shaft 136, when the collar 144 operatively engages the recess 143 the flange 149 will be disposed so as to maintain the pin 148 within the slot 155, as depicted.

The fulcrum 151 comprises an interrupted cylinder that extends perpendicularly outwardly from the lever 150 to be rotatably received within the fulcrum bore 156 provided within the housing 56 of the valve 55. The fulcrum bore 156 transversely intersects the valve chamber 70 such that the axis 158 of the fulcrum bore 156 is substantially tangential to the cylindrical interior surface 159 of the chamber 70. As such, the fulcrum 151 rotates about its axis 158 within the fulcrum bore 156.

The fulcrum 151 is discontinuous, as at 160, to engage an operating rib 161 that extends radially outwardly from the stem portion 68 of the valve element 65. Hence, the effort arm constitutes the radius of the fulcrum 151 from its axis 158 to the engagement of the discontinuity 160 with the operating rib 161.

Figure 7:
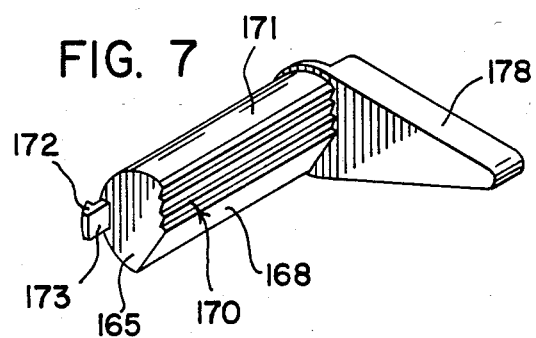
FIG. 7 is an enlarged perspective of the lock plug that is interposed operatively between the post means and the extension members.

Turning now to a more complete description of the lock means 42, a plug 165 is journalled within a cylindrical box 166 oriented transversely between the extension members 46A and 46B and opens through the cylindrical walls of passages 48 and 49 vertically below the O-rings 45. The plug 165, as best seen in FIG. 7, is a cylinder that is truncated along a cord of its circular cross section to provide a flat 168 that runs along at least that length of the plug 165 in proximity to the width of the stiffening flange 34. A plurality of stria 170 extend axially along the cylindrical surface 171 of the plug 165 adjacent one side of the flat 168. As best seen in FIG. 7 the stria 170 provide three grooves delineated by four ridges, and the stria 170 are dimensioned matingly to engage the teeth 41 presented from the flange 34.

Figure 1:
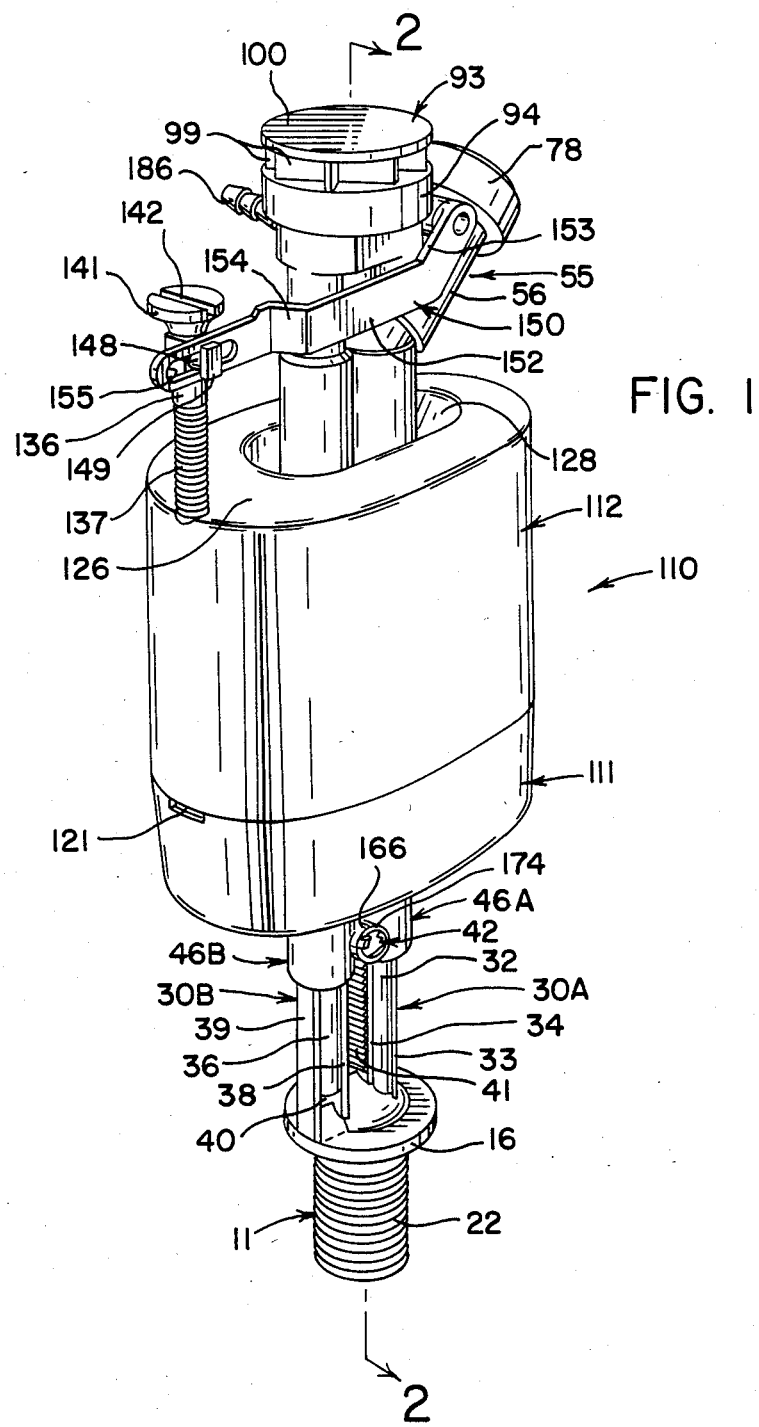
FIG. 1 is a perspective view of a ball cock and float assembly embodying the concept of the present invention.

A radially disposed hook 172 is presented from the outer end of a tab 173 that extends axially from one end of the plug 165 releasably to engage the rim 174 of the box 166 (as depicted in FIG. 1) and thereby selectively retain the plug 165 within the box 166.

Although the aforedescribed configuration of the plug 165, with the flat 168 and stria 170, has been found generally sufficient to maintain the plug 165 in its locked position against movement of the float assembly 110 in one direction but to permit self-releasing in the opposite direction, as more fully hereinafter described with respect to the operation of assembly 10, that result can be enhanced by shaping the teeth 41 so that the upwardly directed surface 175 on each tooth 41 is less sharply inclined with respect to the plane of the stiffening flange 34 than is the downwardly directed surface 176. The desired results may be achieved by employing teeth 41 having an exemplary configuration such that the upwardly directed surface 175 is inclined at an angle of approximately 30°–35° with respect to flange 34 and the downwardly directed surface 176 at approximately 60°–65° with respect to the flange 34. The stria 170 are configured matingly to engage the teeth 41.

An operating lever 178 is affixed to and extends radially outwardly from, the opposite end of the plug 165 from tab 173. One may, if desired, employ raised detent 179 which extends radially outwardly from the surface of extension member 46A to provide a stop which coacts with the operating lever 178 to define the disposition of the lever 178 when the plug 165 is in the locked (solid line configuration in FIG. 4) as well as the unlocked (phantom line disposition in FIG. 4) positions.

OPERATION

Turning now to an operational description of the aforesaid ball cock and float assembly 10, one must first determine the approximate height of the desired water level to be maintained within the reservoir tank 12 properly to effect a flush, and an in gross adjustment of the float assembly 110 may be effected for that approximate height. An in gross adjustment is accomplished by selectively positioning the conjoined extension members 46A and 46B at approximately the desired location along the length of the fixed post members 30A and 30B, respectively. With the lever 178 of the lock means 42 positioned in the phantom position depicted in FIG. 4 the extension members 46 are freely slidable along the post members 30. However, with the lever 178 in the solid line position, the extension members 46 are firmly locked against upward movement along the post members 30. In that way the buoyancy of the float means 110 cannot inadvertantly cause the extension members 50 to slide upwardly along the post members 30.

On the other hand, in order to facilitate in gross adjustment the lock means 42 is self-releasing when sufficient downward pressure is applied to the extension members 46. In that way the float assembly can be adjusted without the necessity for the installer being required repeatedly to immerse his hands in the water within the reservoir tank 12.

Initially, the installer positions the extension members higher than would conceivable be desired, and with the threaded shaft 136 turned approximately half way into the cavity 138. The lever 178 is positioned to engage the lock means 42, and the water is admitted into the reservoir tank 12. When the level of the water reaches approximately the desired height within the tank 12, the installer applies downward presure to the ball cock assembly 10, thereby releasing the lock means 42 and permitting the extension means 46 to telescope downwardly along the post means 30. This action raises the float assembly 110 and closes the valve 55 to prevent the further admission of water into the tank 12.

Thereafter, the water closet may be test flushed to ascertain if the selected water level is sufficient to effect the desired performance, and when the water level lowers, the installer may return the lever 178 to engage the lock means. As the water is thereafter replenished within the tank 12 the installer may rotate the threaded shaft 136 to select the exact height desired for the water within the reservoir tank 12.

The absolute locking action in one direction, in conjunction with the selective lock release in the other direction, is effected by locating the stria 170 on that side of the flat 168 opposite the direction in which the self-release is desired. Thus, by locating the stria 170 upwardly of the flat 168, self-release can be effected only when the extension members 46 are moved downwardly along the post members 30.

With the float assembly 110 thus adjusted, and with the reservoir tank 12 filled to the desired level, the ball cock 10 is disposed in its closed position. That is, the float assembly 110 is buoyed upwardly by the air retained within the bell 112, and in that position of the float assembly 110 the lever 150 permits the valve 55 to remain hydraulically closed. That is, the line pressure in feed line 29 is transmitted along the inlet conduit 52 and through the orifices 75 to the control chamber 76. As disclosed in the aforesaid U.S. Pat. No. 4,479,631, this condition applies a resultant force to the valve element 65 which maintains the washer 73 firmly pressed against the seat 74—i.e., the valve 55 is closed.

During the actual flush the valve 55 will remain closed until the water level within the reservoir tank 12 drops sufficiently below the cup portion 111 so that the weight of the water retained within the cup portion (i.e., the water below the top of the trunk 113) will be sufficient to initiate opening the valve 55. At that point during the flush when the weight of the water within the cup 111 begins to rotate lever 150 to initiate movement of the valve element 65, the water begins to flow past the nozzle 72 and between the washer 73 and seat 74 to effect opening actuation of the valve 55 by virtue of the hydraulic balance effected by such a valve 55, and as is fully disclosed in the aforesaid U.S. Pat. No. 4,479,631, over a wide range of line pressures.

It should be appreciated that in order to obtain the most efficient exiting flow of water from the outlet port 62 of valve 55, the water should be able to flow outwardly, virtually unrestricted, across the full circumferential perimeter of the seat 74. To facilitate this result care should be exercised in designing and locating the shelf 86. As remote as the shelf 86 may initially appear to be from the outlet port 62 of valve 55, the shelf 86 is likely to be formed as the uppermost surface of a panel 180 that extends radially inwardly from the interior surface 81 of casing 82 along the full length of the cavity 63. This arrangement facilitates molding of the casing 82. When so molded, however, it has been found that the panel 180 should not extend all the way from wing wall 84 to wing wall 85. Rather, as is perhaps best depicted in FIG. 5, the lateral sides 181 and 182 of the panel 180 should be spaced circumferentially of the wing walls 84 and 85, respectively, along the interior surface 81 of the casing 82. Even a modest separation of the panel sides 181 and 182 from the wing walls 84 and 85 facilitates the existing flow of water from the outlet port 62 into the line pressure cavity 63 of the siphon-break chamber 60.

As the water fills the cavity 63 it raises the flutter washer 89 upwardly within the casing 82 until it seats against the lower rim 103 of the ring 101 and the downwardly facing rib 104 of the limit flange 96. This permits the in-rushing water to spill over the weir formed by the upper edge 87 of the wing wall 80 and into the well portion 97 of the chamber 60. When the well 97 is filed the water will spill over the second weir formed by the upper edge 91 of the tubular wall 57 and into the low pressure cavity 61.

Even through the flutter washer 89 may provide an imperfect seal against the ring 101 and flange 96, any water that could flow therepast would be channeled outwardly and downwardly by the fins 99 and splash wall 100 to prevent the water from splashing upwardly. The vast majority of the water entering the chamber 60 would exit the cavity 61 downwardly past the flow constriction 183 formed at the upper end of the discharge conduit 53 and thence further downwardly within the conduit 53 and past the second flow constriction 184 (FIG. 2) which circumscribes the opening 40.

The successive series of pressure drop locations created by: spilling the water over the first weir formed by edge 87 of wall 80 into the well 97—and by spilling the water from well 97 over the second, lower weir formed by edge 91 of wall 57—contributes to two desired results. First, this arrangement allows the flow out of chamber 60 to be at a greater rate than the flow into chamber 60, and second, this arrangement reduces the energy level of the water flowing through the chamber 60 to reduce noise. Similarly, the constrictions 183 and 184 in conduit 53 allow some build up of backpressure which further assists in reducing the energy level of the water flowing out of chamber 60, which also tends to reduce the noise level of water flowing through conduit 53.

The bowl fill tube 185 may be attached to the tubular stub 186 that projects from the siphon-break casing 82 to conduct some water to the toilet bowl as the reservoir tank is being filled in order to maintain a level of water within the bowl at a sufficient depth to close the trap and prevent the escape of gases from the sanitary system.

As the water level rises within the reservoir tank 12 the water also rises within the float assembly 110 until at least the level of the overflow opening 121. Beyond that level the float assembly 110 will begin to rise when the water displaced by the air retained within the bell portion 112 is sufficient to effect buoyancy and the assembly 110 floats. Upward movement of the float assembly 10 initiates closure of the valve 55, but without water hammer, as is also fully disclosed in the aforesaid U.S. Pat. No. 4,479,631.

If at any time during a static or dynamic condition of the ball cock and float assembly 10 the pressure within the feed line 29 is reduced to an amount that would initiate reverse flow in the system, air would enter through the vent cap 93 and flow at least through aperture 90 in the flutter washer 89 to admit air under atmospheric pressure into chamber 60. Inasmuch as chamber 60 is interposed wtihin the discharge conduit 53, or at least between the discharge conduit 53 and the outlet port 62 of valve 55, any attempt to siphon water through valve 55 will be completely thwarted by virtue of the fact that atmospheric pressure within chamber 60 will preclude the fluid within cavity 61—or within the discharge conduit 53 as well as the reservoir tank 12— from flowing into cavity 63.

It should, therefore, now be apparent that a ball cock and float assembly embodying the concept of the present invention precludes reverse flow through a hydraulically balanced valve mechanism, even while that valve is open, and otherwise accomplishes the objects of the invention.

I claim:

1. A ball cock for a flush tank comprising:
    a shank portion adapted to pass through a wall of the reservoir tank for connection to a supply line;
    post means extending upwardly from said shank portion;
    extension means telescopically slidable on said post means;
    float means mounted on said extension means for vertical movement;
    lock means connected between said post means and said extension means to permit a selective, in gross, vertical adjustment of said float means;
    horizontally disposed teeth means being presented from said post means;
    a lock plug rotatably supported from said extension means and disposed transversely of said post means;
    a pluraltiy of stria extending along said plug means selectively to inter-engage with said teeth means and thereby secure the selected vertical, in gross, adjustment of said float means;
    a valve means carried by said support means upwardly of said float means;
    an inlet passage communicating from said shank portion to said valve means;
    a discharge passage communicating from said valve means into the flush tank; and,
    means communicating between said discharge passage and the atmosphere to serve as a siphon-break in the event of any attempted reverse flow through said discharge passage.

2. A ball cock, as set forth in claim 1, wherein said lock plug is a truncated cylinder that provides a flat which extends axially of said lock plug; said stria disposed within the cylindrical portion of said plug adjacent one side of said flat.

3. A ball cock, as set forth in claim 2, wherein the lock means is self-releasing in only one direction; said stria being located on that side of the flat opposite the direction in which said self-release is desired; and, wherein lever means extends outwardly of said lock plug to permit manual rotation thereof.

4. A ball cock, as set forth in claim 1, having a shaft means, said shaft means being adjustable vertically with respect to said float means; lever means having a resistance arm and an effort arm; said effort arm being operatively connected to actuate said valve in response to the vertical movement of said float means.

5. A ball cock, as set forth in claim 4, wherein said shaft means is threaded; an annular recess being provided in said threaded shaft; a collar means rotatably engaging said annular recess; said collar means being pivotally secured to the effort arm of said lever means.

6. A ball cock, as set forth in claim 5, wherein means are provided to rotate said shaft means with respect to said float means and said collar means in order to effect a fine adjustment as to the vertical disposition of said float means.

7. A ball cock, as set forth in claim 6, wherein radially extending, planar fin means are provided on said shaft in axially spaced relation beneath the threads.

8. A ball cock, as set forth in claim 1, wherein said valve means has a housing and a valve element that is axially translatable within said housing between an open and closed position; a fulcrum bore extending through said valve housing and disposed transversely of said axially translatable valve element; an operating rib extending radially of said valve element; said lever means having a fulcrum that is rotatably received within said fulcrum bore, said fulcrum comprising a cylinder that is discontinuous, the discontinuity engaging said operating rib.

9. A ball cock, as set forth in claim 8, wherein said valve element is axially translatable within the cylindrical chamber and wherein said cylindrical fulcrum has an axis; said fulcrum being rotatable about said axis; said axis being tangential to said valve chamber; the radius between said axis and the discontinuity that engages said operating rib constituting said resistance arm.

* * * * *